United States Patent [19]

Shimano

[11] Patent Number: 4,480,720
[45] Date of Patent: Nov. 6, 1984

[54] BRAKE OPERATING DEVICE FOR A BICYCLE

[75] Inventors: Keizo Shimano, Osaka, Japan

[73] Assignee: Shimano Industrial Company, Japan

[21] Appl. No.: 437,862

[22] Filed: Oct. 29, 1982

Related U.S. Application Data

[63] Continuation of Ser. No. 183,444, Sep. 2, 1980, abandoned.

[30] Foreign Application Priority Data

Sep. 8, 1979 [JP] Japan ................................ 54-115495
Dec. 11, 1979 [JP] Japan ................................ 54-161090
Dec. 11, 1979 [JP] Japan ......................... 54-171979[U]
Mar. 28, 1980 [JP] Japan ................................. 55-41042

[51] Int. Cl.³ .......................... B62L 3/02; B62L 3/08
[52] U.S. Cl. ............................. 188/24.15; 74/471 R;
74/480 R; 74/501 R; 74/517; 188/2 D;
188/24.16; 188/24.22; 192/48.7
[58] Field of Search .............. 188/24.15, 24.16, 24.14,
188/24.22, 24.11, 2 D, 72.1; 74/501 R, 517, 489,
480 R, 480 B, 471 R; 192/48.7

[56] References Cited

U.S. PATENT DOCUMENTS 2,865,220 12/1958 Bayley .................................... 74/471
3,845,847 11/1974 Camp ................................. 74/489 X
3,942,609 3/1976 Hill ................................... 188/24.16
4,057,127 11/1977 Woodring ......................... 188/24.16
4,267,746 5/1981 Pruett ..................................... 74/489

FOREIGN PATENT DOCUMENTS

2429665 1/1976 Fed. Rep. of Germany ..... 188/2 D
628839 7/1927 France ................................... 74/501
911555 3/1946 France ................................... 74/489
957019 8/1949 France ............................. 188/24.16

Primary Examiner—George E. A. Halvosa
Attorney, Agent, or Firm—Stevens, Davis, Miller & Mosher

[57] ABSTRACT

A brake operating device for a bicycle brake having front wheel and rear wheel brakes is provided with at least one control lever, a movable control member operable in association with operation of the control lever, an associated member for transmitting an operating force of the control lever to the movable control member, a first and a second brake wire transmitting operation of the movable control member to the front and rear wheel brakes, and first and second connecting members connecting the first and second brake wires to the movable control member. The first and second connecting members are pivotally mounted on the movable control member and the associated member is coupled with the movable control member at a position displaced with respect to the center between the pivot points of the first and second connecting members to the movable control member, so that during the initial braking action, the input force to the rear wheel brake exceeds that to the front wheel brake, and thereafter, the input force of the front wheel brake becomes larger than that to the rear wheel brake.

6 Claims, 15 Drawing Figures

FIG. 15

BRAKE OPERATING DEVICE FOR A BICYCLE

This is a continuation of application Ser. No. 183,444 filed Sept. 2, 1980, now abandoned.

FIELD OF THE INVENTION

This invention relates to a brake operating device for a bicycle having brakes for front and rear wheels, and more particularly to a brake operating device which is adapted to operate control levers to actuate the brakes, through brake wires.

BACKGROUND OF THE INVENTION

A conventional brake operating device for a bicycle is provided with control levers corresponding to the brakes for front and rear wheels respectively, each brake being connected with each lever through a brake wire, so that a driver may separately operate the control levers to independently actuate the front and rear wheel brake.

Generally, actuation of only the front wheel brake obtains a larger braking effect than that of the rear wheel brake, but such braking action causes a foreward shift of the centroid of the bicycle resulting in the rear wheel rising from the ground turning the bicycle over around the front wheel hub.

In order to avoid such danger, the rear wheel brake is initially actuated, and after the initial braking action thereof, the front wheel brake may be actuated. However, it is difficult for drivers, especially an unskilled one, to exert the braking action is such steps, resulting in an unavoidable fall of the bicycle.

Conventionally, a brake operating device has been proposed which aims to delay the braking effect of the front wheel brake with respect to the rear wheel brake even when both the front and rear wheel brakes are actuated simultaneously by the control levers. This brake operating device, merely delays actuation of the front wheel brake, but still applies braking pressure to the rear wheel brake through the lever operation even after the front wheel brake is actuated.

The rear wheel brake, when actuated during the bicycle's running, stops rotation of the rear wheel to cause the wheel to skid with respect to the ground due to running speed, and thereafter, the braking effect is not obtained even with further actuation of the rear wheel brake. Accordingly, the braking action of the front wheel brake delayed from the rear wheel brake may be less dangerous, but a period of time for the braking action is lengthened to make it difficult to abruptly brake the bicycle.

SUMMARY OF THE INVENTION

In the light of the above problems, this invention has been designed. The inventor has recognized that the initial braking effect is sufficient by actuating the rear wheel brake, but no braking effect is expected after the rear wheel stops its rotation and begins to skid. Accordingly, this invention is directed to the provision of a relay transmitting mechanism through which an input to the rear wheel brake exceeds that to the front wheel brake during the initial braking action, and thereafter the input to the front wheel brake exceeds that to the rear wheel brake, so that the time for the braking action is reduced to enable abrupt braking while the braking action is exerted in safety without a rise of the rear wheel from the ground.

In detail, the brake operating device of the invention is provided with at least one control lever for actuating the front wheel and rear wheel brakes, a movable control member operable in association with operation of the control lever, an associated means for transmitting operation of the control lever to the movable control member, a first and a second brake wire for transmitting operation of the movable control member to the front wheel and rear wheel brakes, and a first and a second connecting member for connecting the first and second brake wires to the movable control member, the first and second connecting members being pivotally mounted on the movable control member, the associated means being shifted, at its connected position with the movable control member, from the center between pivot points of the first and second connecting members to the movable control member, so that an input to the rear wheel brake exceeds that to the front wheel brake in a period of the initial braking action, and thereafter, the input to the front wheel brake becomes larger than that to the rear wheel brake.

The aforesaid period of the initial braking action means a period from a cessation of rotation of the rear wheel by the actuated rear wheel brake to the time of skidding of the rear wheel with respect to the ground.

In this brake operating device of the invention, only one control lever may be mounted on either the right- or left-hand side of a handle bar at the bicycle, or two control levers may be mounted at both right- and left-hand sides of the handle bar.

The movable control member serves to relay the operation of the control lever to the first and second brake wires connected with the front and rear wheel brakes to thereby control the brakes according to the foregoing, and is disposed at an intermediate portion between the front and rear wheel brake and the control lever.

The intermediate portion includes a position apart from the control lever and that in proximity thereto. The movable control member, when disposed away from the control lever, is housed within a support housing attached to the bicycle frame so that the associated means uses control wires. While, the movable control member, when disposed in proximity to the control lever, is housed within a bracket member fixed at the handle bar so as to pivotally support the control lever, the bracket member being utilized as the aforesaid support housing, and an associated member swingable together with the control lever is provided thereat so as to be connected directly to the movable control member.

The front and rear wheel brakes applied with the brake operating device of the invention are composed mainly of calliper brakes, but any type of brake, if actuated by the brake wire, is may all used.

These and other objects of the invention will become more apparent in the detaled description in accordance with the accompanying drawings.

DETAILED DESCRIPTION OF THE INVENTION

Figure 1:
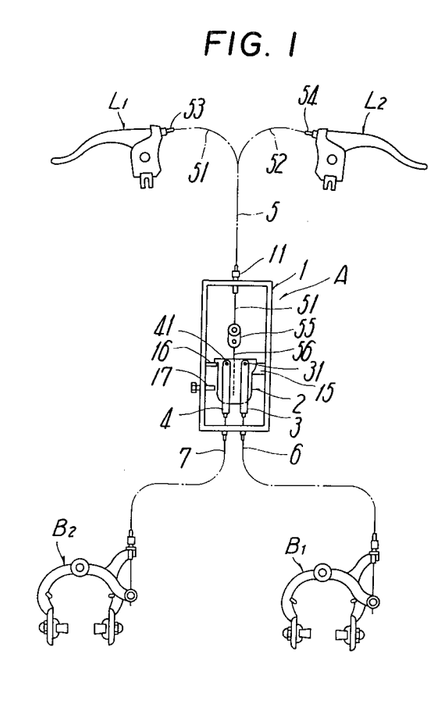
FIG. 1 is schematic view exemplary of a brake operating device of the invention, which is applied to the calliper brakes.

The bicycle brake applied with the brake operating device of the invention, comprises a front brake $B_1$ mounted on the front wheel side of the bicycle and a rear brake $B_2$ mounted on the rear wheel side. The respective brakes $B_1$ and $B_2$ are connected with a brake wire, actuated by a pulling thereof, and, as shown in FIG. 1, mainly comprise calliper brakes having a pair of brake shoes $S_1$ and $S_2$ which contact with a wheel rim (not shown) for the braking action. In addition, the brakes $B_1$ and $B_2$ alternatively may comprise the drum type brakes and others if they are actuated by pulling the wires.

The brake operating device of the invention, in brief, comprises control levers $L_1$ and $L_2$ and a relay transmitting mechanism A for transmitting operations of levers $L_1$ and $L_2$ to the front and rear wheel brakes $B_1$ and $B_2$ respectively. The two control levers $L_1$ and $L_2$ shown in FIG. 1 alternatively may be replaced by one. In either case, one transmitting relay mechanism A is used.

The two levers $L_1$ and $L_2$, when in use, are mounted on the right-hand and left-hand sides of a handle bar (not shown) so that either one of levers $L_1$ and $L_2$ may operate the transmitting relay mechanism A to actuate the brakes $B_1$ and $B_2$ as hereinafter described.

The relay transmission mechanism A is interposed between the control levers $L_1$ and $L_2$ and the front and rear wheel brakes $B_1$ and $B_2$. In the initial braking action of operating one or both of levers $L_1$ and $L_2$ to actuate the brakes $B_1$ and $B_2$, the mechanism A functions to give the rear wheel brake $B_2$ an input larger than that given to the front wheel brake $B_1$, and after the initial braking action, the input to the front wheel brake $B_1$ is made larger than that to the rear wheel brake $B_2$. The relay transmission mechanism A basically comprises a support housing 1 fixed to the bicycle frame or the like, a movable control member 2 housed within the support housing 1 and operable in association with operation of control levers $L_1$ and $L_2$, and two first and second connecting members 3 and 4 for relaying the operation of movable control member 2 to front and rear wheel brakes $B_1$ and $B_2$.

The movable control member 2 is connected to the control levers $L_1$ and $L_2$ and operable in association therewith by way of associated means 5. The first connecting member 3 is connected to the front wheel brake $B_1$ by way of a first brake wire 6, and the second connecting member 4 is connected to the rear wheel brake $B_2$ by way of a second brake wire 7.

The first and second connecting members 3 and 4 are pivoted to the movable control member 2 through pins 31 and 41 respectively. The associated means 5 is connected to the movable control member 2 at a position shifted toward the second connecting member 4 from the center between the pivot points of connecting members 3 and 4 to the movable contraol member 2.

The relay transmission mechanism A, as shown in FIGS. 1 through 5, has the support housing 1 fixed away from the control levers $L_1$ and $L_2$, for example, at a head pipe (not shown) of the bicycle frame, and employs control wires as the associated means 5. In addition, the embodiment shown in FIGS. 1 through 5 uses two control levers $L_1$ and $L_2$ so that two control wires 51 and 52 constitute the associated means 5.

Figure 2:
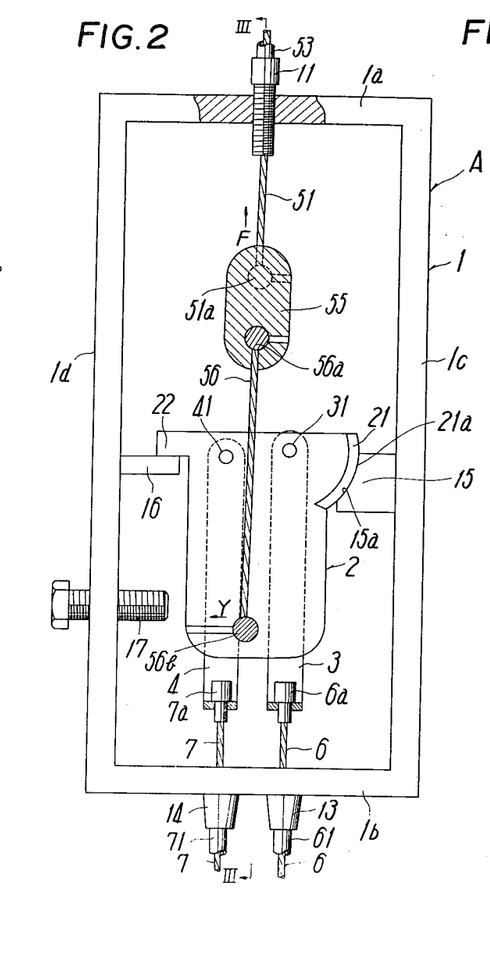
FIG. 2 is a partially cutaway front view of an embodiment of the brake operating device of the invention, showing an enlarged principal portion of the embodiment.

The support housing 1 is of a flat, elongate box-like shape and is provided at the upper wall 1a with holders 11 and 12 screwably mounted thereon and supporting outer sheaths 53 and 54 guiding the control wires 51 and 52, and at the lower wall 1b with holders 13 and 14 for outer sheaths 61 and 71 guiding brake wires 6 and 7.

The support housing 1 also is provided at its side walls 1c and 1d with a pair of support members 15 and 16 for supporting the movable control member 2. A stopper 17 opposite to the lateral side of movable control member 2 at a side of the pivot portion of second connecting member 4, is mounted on the side wall 1d and below the second support member 16 in a relationship of being adjustable in position by screw means.

The respective control wires 51 and 52 are connected at a first end with each of control levers $L_1$ and $L_2$ and inserted at a second end into the support housing 1 through the holders 11 and 12 and connected to one intermediate member 55 through wire end pieces 51a and 52a, the intermediate member 55 being connected to the movable control member 2 through a connecting wire 56 having at both ends pieces 56a and 56b.

Figure 3:
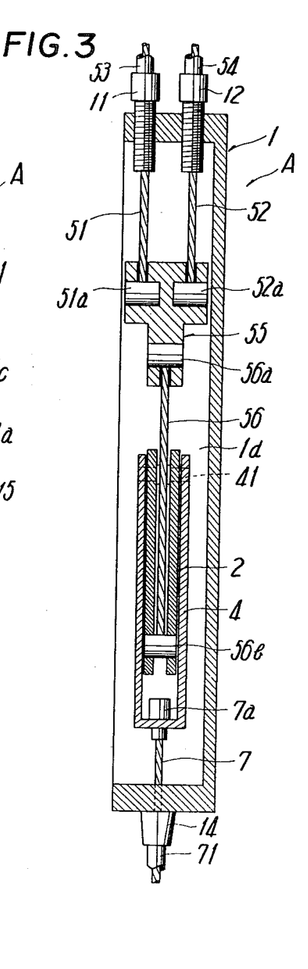
FIG. 3 is a sectional view taken on the line III—III in FIG. 2, FIGS. 4 and 5 are front views, corresponding to FIG. 2, of the FIG. 2 embodiment in operating condition.

Furthermore, the movable control member 2, as shown in FIG. 3, comprises two plates opposite to each other at a narrow space, each plate having a pair of first and second shoulders 21 and 22 supported by the support members 15 and 16 respectively.

The two plates connect with each other at the first shoulder 21, insert the connecting wire 56 into the space between the plates, and support at the lower portions the wire end piece 56b, the shoulder 21 having a face 21a of a circular arc as shown in FIG. 2. The first support member 15 has a receiving face 15a of a circular arc to mate with the face 21a at the shoulder 21.

The first and second connecting members 3 and 4, as shown in FIG. 3, are elongate and U-like shaped in section, sandwich the movable control member 2 at both widthwise sides thereof, extend vertically and in parallel to each other, are pivoted at the upper ends to the upper portion of movable control member 2 through pins 31 and 41, and engage at the lower ends with the wire end pieces 6a and 6b of brake wires 6 and 7 respectively.

The first and second connecting members 3 and 4 are pivoted to the movable control member 2 so that the center between the pivot points may meet with the widthwise center of the movable control member 2. The connecting wire 56 is connected to the movable control member 2 through the end piece 56b at a position shifted toward the second connecting member 4 from the widthwise center of movable control member 2.

In the aforesaid construction, the second support member 16 is not inevitably necessary, but is useful, if provided, to prevent careless operation of movable control member 2 due to return springs at the brakes $B_1$ and $B_2$.

The aforesaid intermediate member 55 and connecting wire 56 are necessary when two control levers $L_1$ and $L_2$ are used, but unnecessary for only one control lever when in use, because the control wires may be connected directly to the movable control member 2. In addition, use of two control wires $L_1$ and $L_2$ is advantageous for a rider because he can operate them desirably from either the right-hand or the left-hand side of the handle bar.

In the brake operating device of the invention, when braking is desired, both or either one of two control levers $L_1$ and $L_2$ are operated to pull both or either one of the control wires 51 and 52. Now, the braking action by simultaneous operation of both the levers $L_1$ and $L_2$, will be described.

Figure 4:
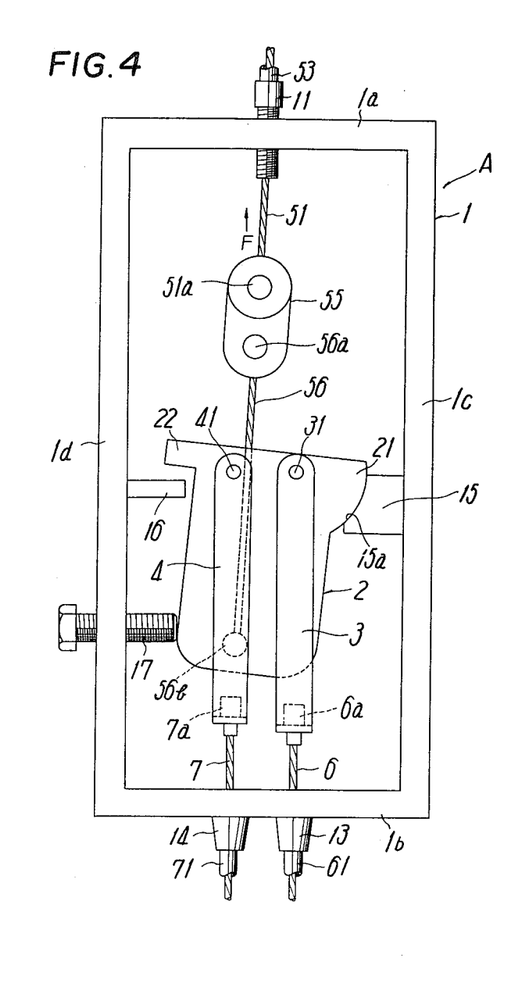

When the control levers $L_1$ and $L_2$ are operated to pull control wires 51 and 52, the movable control member 2, during the initial braking action, swings clockwise around the vicinity of pin 31 so that the second connecting member 4, as shown in FIG. 4, moves in the direction F in FIG. 4, thereby pulling the second brake wire 7 to actuate at first the rear wheel brake $B_2$.

When the rear wheel brake $B_2$ is actuated to press-contact brake shoes thereof against the wheel rim, the movable control member 2 is subjected to a greater resistance against its clockwise swinging motion so as to cease rotation. Thereafter, the movable control member 2, conversely, swings counterclockwise around the vicinity of pin 41.

Figure 5:
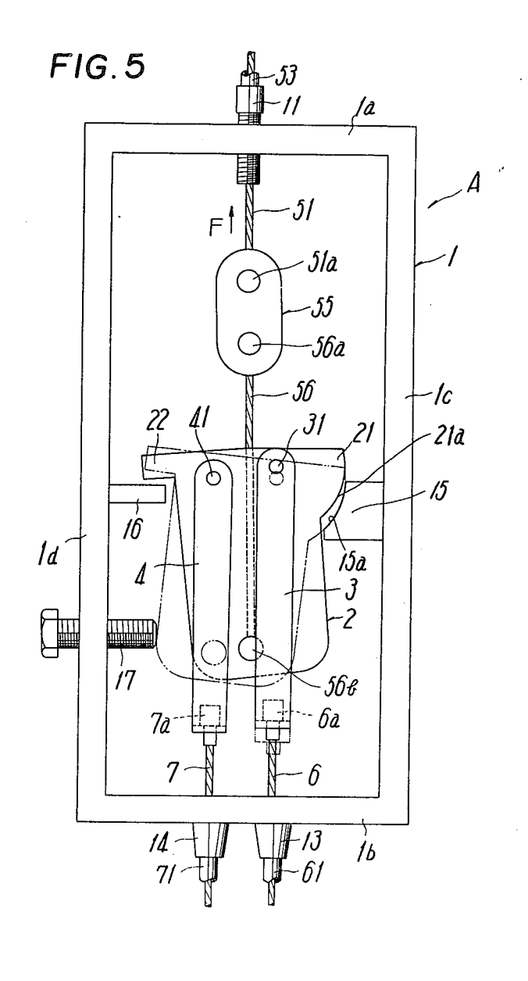

The counterclockwise swinging motion of movable control member 2, as shown in FIG. 5, allows the first connecting member 3 to move in the direction F to actuate the front wheel brake $B_1$.

Figure 15:
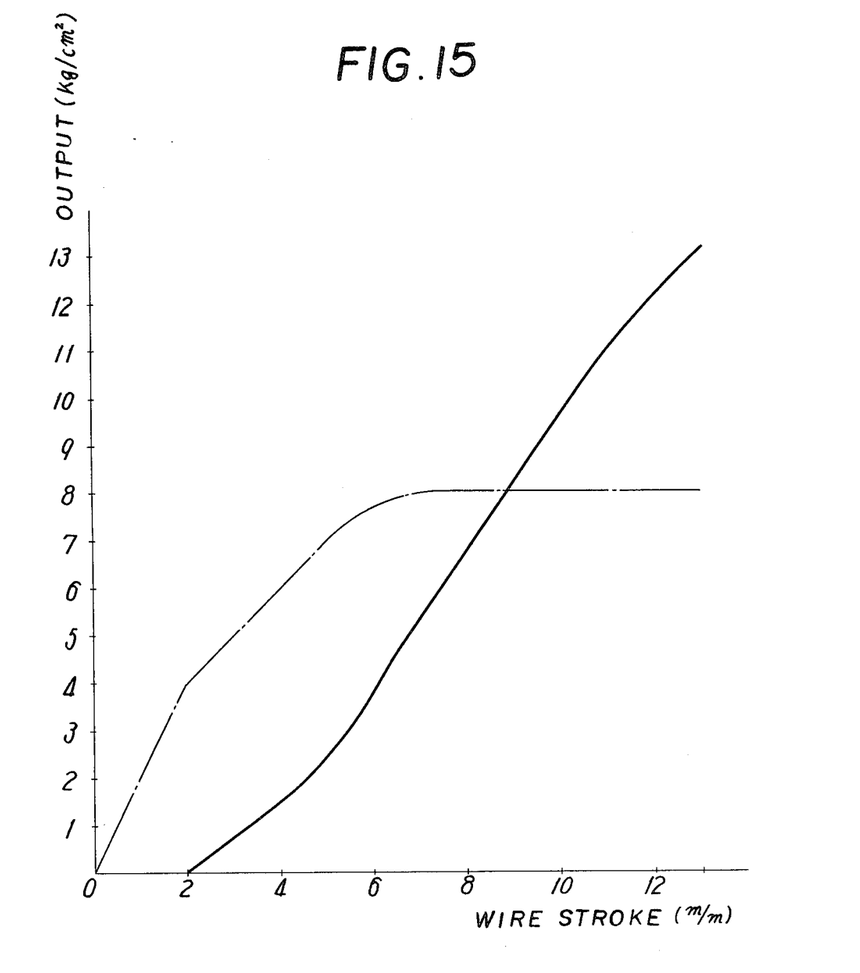
FIG. 15 is a graph showing output characteristic curves of front and rear wheel brakes.

As seen from the above, inputs applied to the levers $L_1$ and $L_2$, during the initial braking action, are transmitted to the rear wheel brake $B_2$ only as shown by the dot-and-dash line in FIG. 15, whereby an output force of rear wheel brake $B_2$ becomes larger than that of front wheel brake $B_1$ to thereby perform the braking action in safety. After the initial braking action, the input force to the front wheel brake $B_1$ becomes larger than that to the rear wheel brake $B_2$, as shown by the solid line in FIG. 15, whereby the output force of front wheel brake $B_1$ increases and that of rear wheel brake $B_2$ attenuates, thus effectively utilizing the braking force of front wheel brake B to reduce the time for the braking effect while performing the braking action in safety without the rear wheel rising from the ground.

In the above construction, the output force characteristics of front and rear wheel brakes $B_1$ and $B_2$, are adjustable by changing the amount of displacement between the connecting position of connecting wire 56 to the movable control member 2 with respect to the center between the pivot points of first and second connecting members 3 and 4. Hence, during the initial braking action, not only the front wheel brake $B_1$ is actuated simultaneously with the rear wheel brake $B_2$ but also the output force of front wheel brake $B_1$ is made about zero, and the rear wheel brake $B_2$ is actuated prior to actuation of front wheel brake $B_1$, and thereafter the front wheel brake $B_1$ can be sequentially actuated at a desired time delay. Such an operation can further ensure safety in the braking action.

After the initial braking action, the output force of rear wheel brake $B_2$ is less than the output force of front wheel brake $B_1$, in which the aforesaid attenuation of the output force characteristic is preferable for the rear wheel brake $B_2$.

Consequently, the output characteristics of front and rear wheel brakes $B_1$ and $B_2$, can be nearly ideal so as to improve the braking effect and further reduce the time for the braking effect. In addition, in FIG. 15, the abscissa indicates a wire stroke of the respective control wires 51 and 52 and the ordinate indicates an output force of the respective brakes, and the output force characteristic curve of front wheel brake $B_1$ is shown by the solid line and that of rear wheel brake $B_2$ by the dot-and-dash line.

Figure 6:
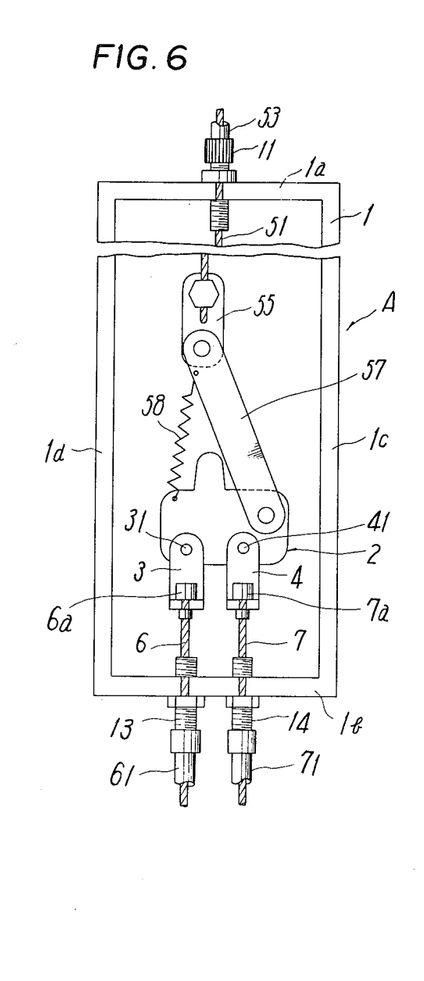
FIG. 6 is a partially omitted front view of a principal portion of a modified embodiment of the invention.

Alternatively, a link 57, as shown in FIG. 6, may be substituted for the connecting wire 56. The link 57 is pivoted at its one end to the intermediate member 55 and at the outer end to the movable control member 2 so as to be positioned rightwardly from the pivot point of second connecting member 4, thus being slanted with respect to the direction of pulling the control wires 51 and 52 as shown in FIG. 6. Between the link 57 and the movable control member 2 is provided a spring 58 for biasing the link 57 in the slanting direction.

In this construction, when the control wires 51 and 52 are pulled for braking, the spring 58, during the initial operation of the wires, is not deflected so that the link 57 is kept slanted and operates in response to the pull operations of control wires to thereby allow the movable control member 2 to move nearly straight, thus simultaneously actuating front and rear brakes $B_1$ and $B_2$. Thereafter, the spring 58 is expanded as the braking pressure at the respective brakes $B_1$ and $B_2$ increases, so that the link 57 swings to become parallel to the direction of pulling wires 51 and 52. Hence, the movable control member 2 swings around the pivot point of the second connecting members 4 so that the inputs from levers $L_1$ and $L_2$ are transmitted only to the first connecting member 3 of the first brake wire 6 connected to the front wheel brake $B_1$. As a result, only wire 6 is pulled to actuate only the front wheel brake $B_1$, thereby increasing the output force of the front wheel brake $B_1$.

This embodiment also is adjustable of inputs to the front and rear wheel brakes $B_1$ and $B_2$ by selectively changing the pivot point of link 57 at the movable control member 2 with respect to the pivot points of first and second connecting members 3 and 4 to the movable control member 2.

Figure 9:
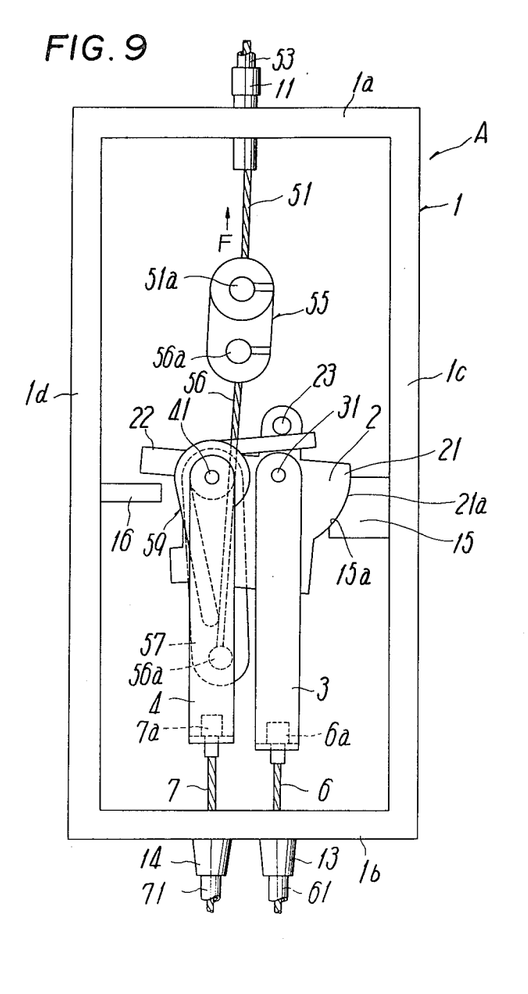
FIGS. 9 and 10 are enlarged sectional views of only the principal portion at the FIG. 7 embodiment in operating condition.

Alternatively, the connecting wire 56, as shown in FIGS. 7 through 10, may be used together with the link 57. In this instance, the link 57 is connected at the lowermost end thereof to the end piece 56b of wire 56 and pivoted at the upper end to the upper position of movable control member 2 through the aforesaid pivot pin 41, and a spring 59 is interposed between the lower portion of the link 57 and the movable control member 2. The spring 59 comprises a wire material and is wound at its intermediate portion around the pin 41 and bent at its first end to be retained to the lower portion of link 57 and at its second end to a pin 23 projecting from the upper edge of movable control member 2. Also, the spring 59 is larger in strength than return springs at the front and rear wheel brakes $B_1$ and $B_2$ so that when the control levers $L_1$ and $L_2$ are operated to pull the connecting wire 56 upwardly (in the direction of the arrow F in FIG. 7), the spring 59 is not deflected and the link 57, as shown in FIG. 9, swings clockwise together with the movable control member 2 to thereby actuate the rear wheel brake $B_2$ the same as the aforesaid first embodiment.

Figure 10:
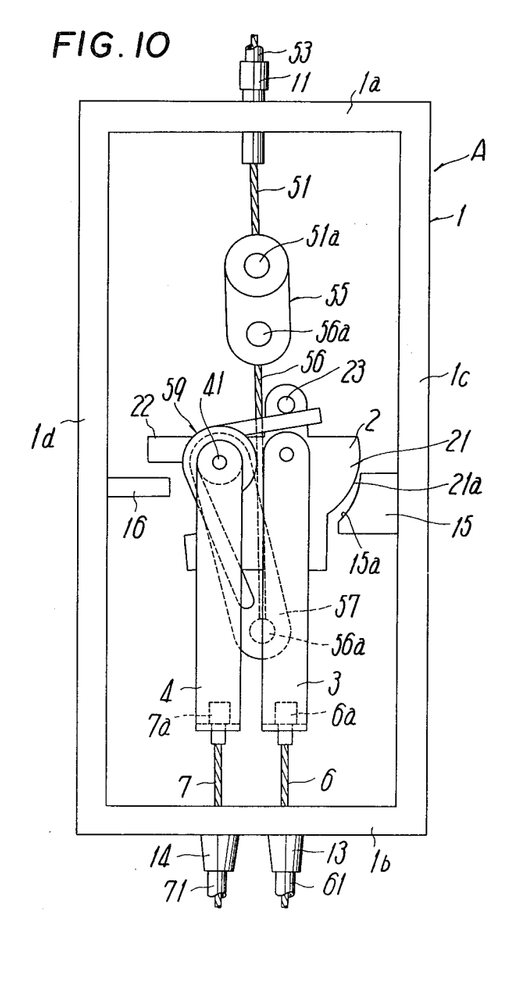

Upon the actuation of rear wheel brake $B_2$, the movable control member 2 is subjected to greater resistance to its clockwise swinging motion so as to cease rotating, at which time, the connecting wire 56 is pulled overcoming the spring 59 so that the spring 59 is gradually deflected to allow the link 57 to swing counterclockwise as shown in FIG. 10. Simultaneously, the movable control member 2 swings counterclockwise to actuate the front wheel brake $B_1$.

At this time, a pulling stroke of second brake wire 7 decreases to allow the output force of rear wheel brake $B_2$ to attenuate and the output force of front wheel brake $B_1$ increases, thereby ensuring the braking action occurs in safety without raising the rear wheel from the ground.

Figure 7:
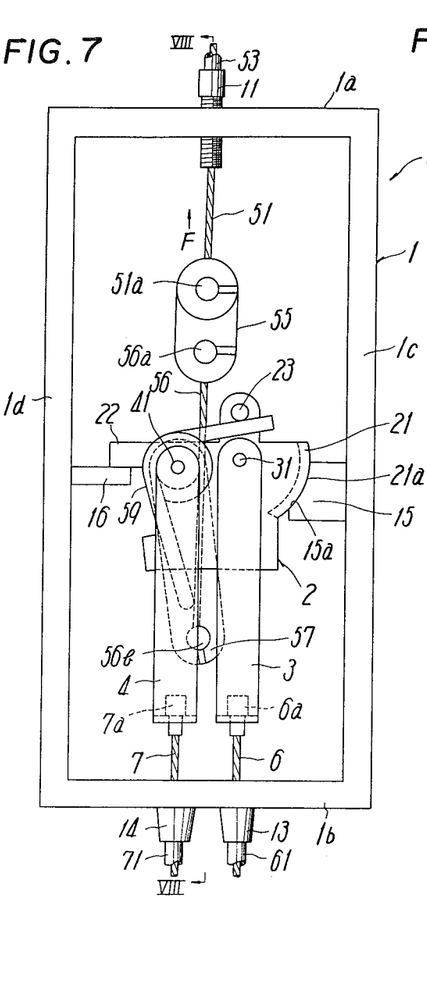
FIG. 7 is a front view of another modified embodiment of the invention.
Figure 8:
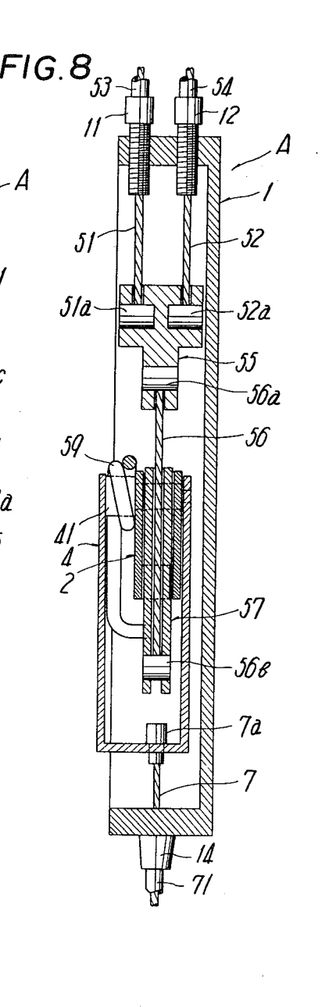
FIG. 8 is a sectional view taken on the line VIII—VIII in FIG. 7.

The reason for use of the spring 59 in this embodiment is that the braking forces by levers $L_1$ and $L_2$ are intended to be switched gradually from the rear wheel brake $B_2$ to the front wheel brake $B_1$, so that the braking pressure thereof increases gradually, not abruptly, to improve the safety of the braking action.

Figures 11, 12:
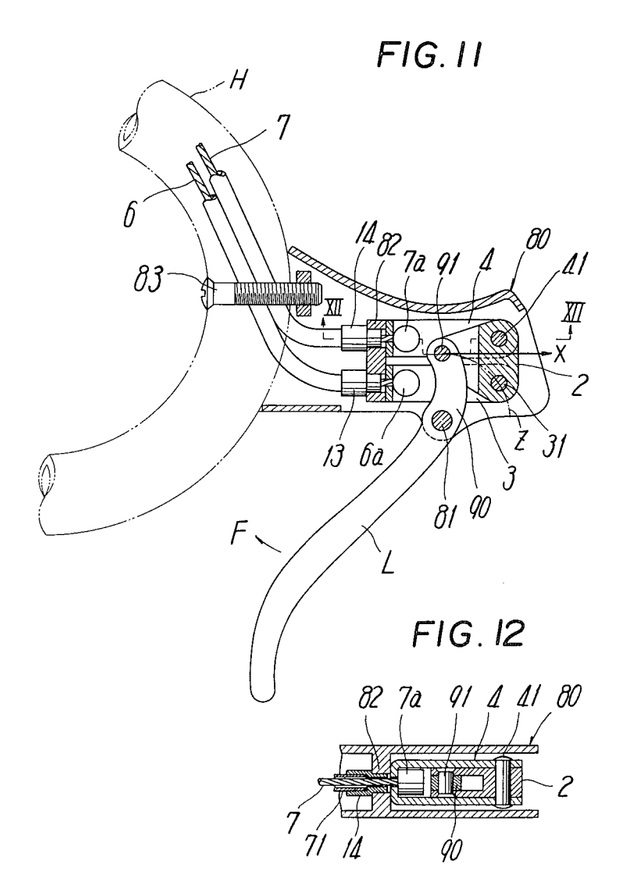
FIG. 11 is a longitudinal sectional view of a further modified embodiment of the invention.
FIG. 12 is a sectional view taken onthe line XII—XII in FIG. 11, FIGS. 13 and 14 are enlarged sectional view showing only the principal portion of the FIG. 11 embodiment in operating condition.
Figure 13:
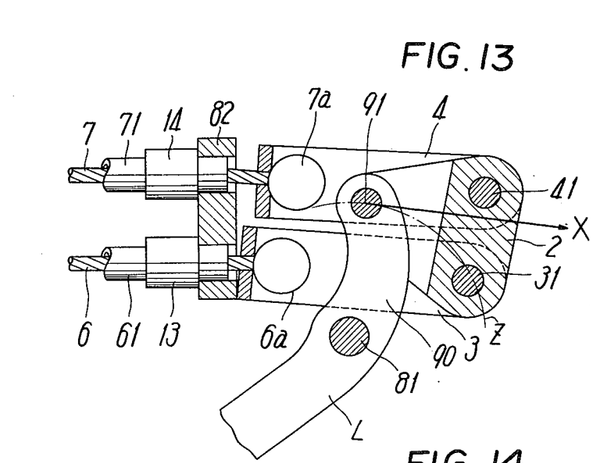
Figure 14:
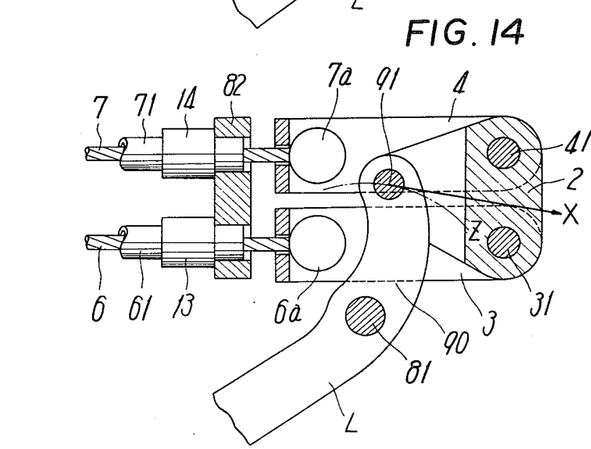

Alternatively, one control lever L, as shown in FIG. 11, may be substituted for the two control levers $L_1$ and $L_2$ and a box-like bracket member 80 for pivotally supporting the lever L may be utilized as the aforesaid support housing 1, so that the relay transmitting mechanism A may be housed within the bracket member 80, which is fixed to the handle bar H by a fixture 83. The control lever L is pivoted to one side of bracket member 80 through a lever shaft 81 and provided with an associated member 90 which enters the bracket member 80 to be pivoted to the movable control member 2 through a pin 91. In this embodiment, the associated member 90 serves as the associated means corresponding to the control wires 51 and 52 at the former embodiments.

The first and second connecting members 3 and 4 are pivoted to the movable control member 2 at a side of swinging motion of associated member 90 with respect to the pivotally connecting point thereof to the movable control member 2. The center between the pivot points of first and second connecting members 3 and 4 is positioned ahead of the pivotally connecting point of associated member 90 in the moving direction of the pivotally connecting point when the associated member 90 swings. The second connecting member 4 is positioned rearwards in the swinging direction of associated member 90, with respect to the center between the pivot points.

In the above construction, the control lever L is operated in the direction of the arrow F in FIG. 11 to swing the associated member 90 around the lever shaft 81 so that the connecting point of associated member 90 moves along a path Z of a circular arc. Hence, the operating force of lever L acts in the direction of a tangent X to the path Z, and then deflects toward the pivot point side of first connecting member 3 as the connecting point of member 90 moves in a circular arc. As a result, during the initial braking action, the associated member 90 swings to allow the movable control member 2 to swing clockwise around the vicinity of the pivot point of the first connecting member 3 to thereby move the second connecting member 4 to actuate the rear wheel brake $B_2$, at which time, the braking force from the control lever L acts on the rear wheel brake $B_2$ to apply thereto an output force larger than that of the front brake $B_1$, thereby braking the rear wheel.

Upon actuation of rear brake $B_2$, the second connecting member 4 is subjected to a greater resistance against its movement, whereby the movable control member 2 changes its swinging direction and swings counterclockwise around the vicinity of the pivot point of the second connecting member 4, at which time, the connecting point of movable control member 2 with the associated member 90 shifts forward in the swinging direction thereof, so that the operating force of control lever L deflects in its acting direction sequentially from the tangent X toward the first connecting member 3 as in the foregoing. Hence, the input for braking is switched sequentially from the rear wheel brake $B_2$ to the front wheel brake $B_1$ without any loss, thereby improving the controllability of control lever L due to its smaller stroke until the braking action is complete.

In this embodiment, the associated member 90 is preferably integral with the control lever L, but may be separate therefrom. The outer sheathes 61 and 71 guiding the brake wires 6 and 7, are supported to the inner support wall 82 at the bracket member 80.

In all the aforesaid embodiments, the outer sheathes 61 and 71 may not be used and also the outer sheaths 53 and 54 may be omitted even when the control wires 51 and 52 are used.

As seen from the above, the brake operating device of the invention is so constructed that the movable control member is operated to controllably actuate the front and rear wheel brakes by way of the first and second connecting members pivoted to the movable control member and of the first and second brake wires connected to the connecting members respectively, so that an input force to the rear wheel brake is made larger than that to the front wheel brake during the initial braking action, and thereafter, the input force to the front wheel brake is made larger than that to the rear wheel brake, whereby the front wheel brake is effectively used to reduce the time for the braking action so as to enable abrupt braking while the braking action is performed in safety without raising the rear wheel from the ground.

As many apparently widely different embodiments of this invention may be made without departing from the spirit and scope thereof, it is to be understood that the invention is not limited to the specific embodiments thereof except as defined in the appended claims.

What is claimed is:

1. A brake operating device for a bicycle brake having a front wheel brake for braking a front wheel of a bicycle and a rear wheel brake for braking a rear wheel of a bicycle, said device comprising,
    (a) at least one control lever for operating said front and rear brakes,
    (b) a movable control member operable in response to the operation of said control lever,
    (c) means for transmitting an operating force of said control lever to said movable control member,
    (d) a first brake wire for transmitting operation of said movable control member to said front wheel brake,
    (e) a second brake wire for transmitting operation of said movable control member to said rear wheel brake,
    (f) a first connecting member connecting said first brake wire to said movable control member, (g) a second connecting member connecting said second brake wire to said movable control member, said first and second connecting members being pivotally mounted on said movable control member, said means for transmitting being connected with said movable control member by a connecting means which establishes a connecting position for said transmitting means, said connecting position being at a side of said movable control member which is toward the connecting positions of said first and second brake wires to said connecting members and away from an opposite side of said movable member containing the pivot points of said first and second connecting members, said transmitting means being shifted at its connecting position with respect to the center between the pivot points of said first and second connecting members, so that, during the initial operation of said control lever, the connection position of said transmitting means moves in a direction away from said center to rotate said movable member in a first direction and increase an input force to said rear wheel brake at a higher rate than that of an input force to said front wheel brake and thereby actuate said rear wheel brake with a greater input force than applied to said front wheel brake, and after actuation of said rear wheel brake to a point where it begins to brake said rear wheel but before creation of skidding after cessation of rotation of said rear wheel, said connecting position of said transmitting means turns over through said center and said movable member rotates in a second direction opposite to said first direction to thereby increase an input force to said front wheel brake at a higher rate than that of an input force to said rear wheel brake and increase the total force applied to said front wheel brake to a point where it exceeds the total force applied to said rear wheel brake.

2. A brake operating device according to claim 1, wherein said movable control member is disposed at an intermediate portion between the control lever and said front and rear wheel brakes, and said means for transmitting comprises at least one control wire having first and second wire ends, said first wire end connected controllably to said control lever, said second wire end connecting controllably to said movable control member.

3. A brake operating device according to claim 2, wherein said device includes a support housing fixed to the bicycle frame, said support housing containing therein said movable control member and having a pair of first and second support members, said movable control member having at both sides of the upper portion a pair of first and second shoulders supported to said support members respectively, said first and second connecting members being pivoted to said movable control member in the vicinity of each of said shoulders, so that said control wire engages at the second wire end thereof with said movable control member at the lower portion thereof and at a position displaced toward said second connecting member with respect to the center between pivot points of said first and second connecting members.

4. A brake operating device according to claim 3, wherein said first shoulder is formed of a face of a circular arc, and said first support member supporting said first shoulder has a receiving face of a circular arc corresponding to said face of a circular arc at said first shoulder.

5. A brake operating device according to claim 3, wherein a stopper is mounted on said support housing, said stopper being opposite to a lateral surface of said movable control member at the side of pivotal support for said second connecting member, and being freely adjustable in position with respect to said lateral surface.

6. A brake operating device for a bicycle brake having a front wheel brake for braking a front wheel of a bicycle and a rear wheel brake for braking a rear wheel of a bicycle, said device comprising:
(a) at least one control lever for operating said front and rear brakes,
(b) a movable control member operable in response to the operation of said control lever,
(c) means for transmitting an operation force of said control lever to said movable control member,
(d) a first brake wire for transmitting operation of said movable control member to said front wheel brake,
(e) a second brake wire for transmitting operation of said movable control member to said rear wheel brake,
(f) a first connecting member connecting said first brake wire to said movable control member,
(g) a second connecting member connecting said second brake wire to said movable control member,
said first and second connecting members being pivotally mounted on said movable control member, said means for transmitting connected with said movable control member being shifted at its connecting position with respect to the center between the pivot points of said first and second connecting members, said movable control member being disposed at an intermediate position between said control lever and said front and rear wheel brakes, said means for transmitting comprising at least one control wire having first and second wire ends, said first wire end connected controllably to said control lever, said second wire end connecting controllably to said movable control member, said means for transmitting including an intermediate member having a fixture for fixing said second wire and a link for connecting said intermediate member with said movable control member, said link being pivoted to said intermediate member and movable control member so that the pivot point of said link to said movable control member is displaced toward said second connecting member with respect to the center between the pivot points of said first and second connecting members, and a spring being interposed between said movable control member and said link, so that, during the initial operation of said control lever said link and spring operate such that said movable member moves to apply an input force to said rear wheel brake which increases at the same rate as that of an input force applied to said front wheel brake, and after actuation of said rear wheel brake to a point where it begins to brake said rear wheel but before creation of skidding after cessation of rotation of said rear wheel, said link and spring operate such that said movable member moves to apply an input force to said front wheel brake which increases at a higher rate than that of an input force applied to said rear wheel brake to increase the total force applied to said front wheel brake to a point where it exceeds the total force applied to said rear wheel brake.

* * * * *